March 24, 1970         R. K. WILSON         3,502,099
FLOW VALVE FOR RESPIRATION SYSTEM
Filed Sept. 30, 1966
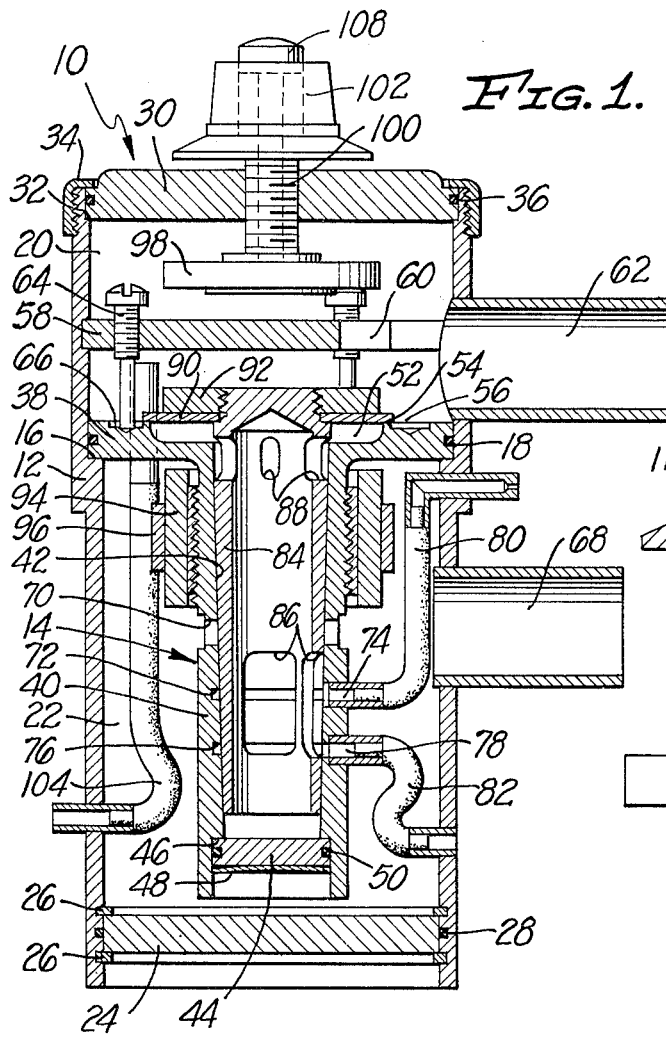
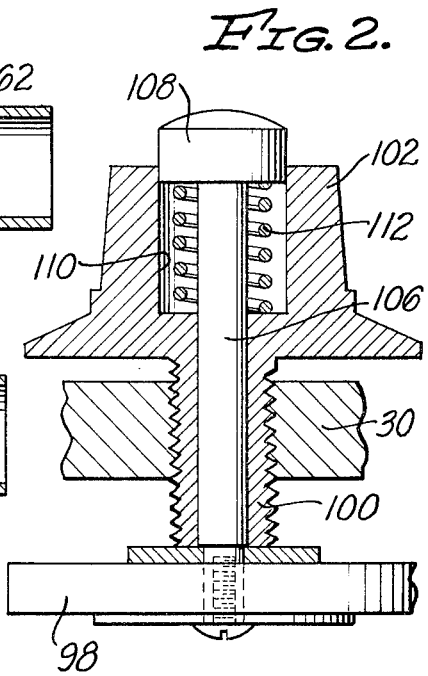
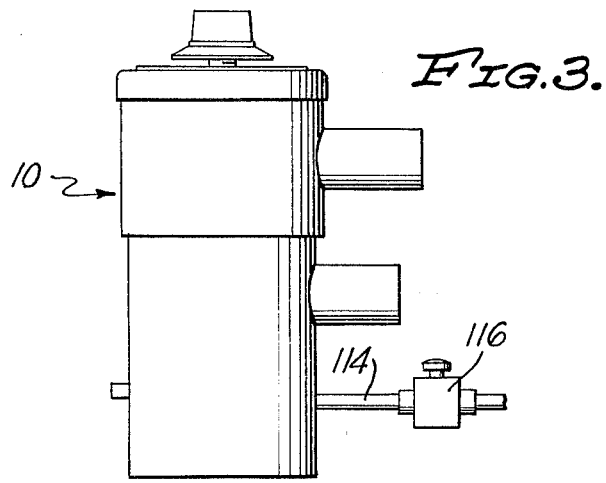
INVENTOR
ROBERT K. WILSON
BY
MAHONEY & HORNBAKER
ATTORNEYS

United States Patent Office 3,502,099
Patented Mar. 24, 1970

3,502,099
FLOW VALVE FOR RESPIRATION SYSTEM
Robert K. Wilson, Los Angeles, Calif., assignor, by mesne assignments, to Dynasciences Corporation, Los Angeles, Calif., a corporation of Pennsylvania
Filed Sept. 30, 1966, Ser. No. 583,297
Int. Cl. G05d 7/06; F16k 31/14, 17/00
U.S. Cl. 137—495          10 Claims

ABSTRACT OF THE DISCLOSURE

A flow sensitive valve used in conjunction with a positive pressure flow cutoff respiration system has a housing mounted valve member which is automatically movable to an open position from a fully closed position permitting a positive pressure flow of upstream gas through the housing between inlet and outlet ports thereof upon the combination of an initial negative force downstream of the outlet port created through attempted inspiration by a patient causing a flow of gas away from and downstream of said outlet port initiating said opening movement immediately followed by said positive pressure upstream gas flow through the housing forcing completion of the valve member opening movement. The valve member is arranged so as to prevent any pressure of any gas upstream of the housing inlet port from moving the valve member from this fully closed position when positioned therein, and the valve member automatically moves to this fully closed position upon cessation of the positive pressure upstream gas flow therethrough when the lung capacity of the patient is reached to stop such flow. The valve member is balanced by magnets sensitive to the initial negative downstream force and the following positive pressure upstream gas flow, such magnetic balancing permitting the valve member movement as described. Balance overriding means is normally inactive and free of affecting the valve member movement and balance, but is actionable upon selective momentary operation thereof for momentarily altering such balance of the valve member in its fully closed position to initiate the movement of the valve member from said fully closed position despite any lack of any part of the initial negative downstream force created by the patient. The balance overriding means can be means for physically changing the magnet balancing of the valve member or means for creating a gas pressure build up totally within the valve member, in either case, replacing the negative downstream force as would be created by the patient and causing initiation of movement of the valve member from its fully closed position.

---

This invention relates to a flow valve for a respiration system, and more particularly, to a flow valve particularly advantageous for use in a positive pressure flow cutoff respiration system. Even more particularly, this invention relates to a flow valve for a respiration system of the type having magnet means balancing a valve member thereof in a closed position and sensitive to a minimum force tending to move said valve member to an open position for gas flow through said valve, said magnetically balanced type of valve being disclosed and claimed in my co-pending application, Ser. No. 578,184, filed Sept. 9, 1966, entitled "Positive Pressure Flow Cutoff Respiration System" and over which the present invention constitutes an improvement.

As discussed in my said co-pending application. Ser. No. 578,184, positive pressure respiration systems of various types have been used in inhalation therapy for the administration of oxygen and other adjuvant gases in the treatment of patients having various pulmonary and coronary diseases, as well as for a multiplicity of other medical treatment purposes. Furthermore, in the positive pressure flow cutoff type of respiration system, as disclosed in said co-pending application, the patient initiates the flow of gas by slight inspiration, after which, the patient is forced to inspire as much of a desired gas as his lungs will permit or accept. One of the prime keys to success of such positive pressure flow cutoff respiration systems is the sensitivity of the flow valve forming a part of and controlling said system in view of the fact that a particular patient's attempted inspiration can be relatively slight, depending on the condition of said patient, and said flow valve must be capable of being sensitized to even such slight inspiration attempts for actuating the same and causing the flow of said gas to said patient.

In general terms, positive pressure flow cutoff respiration systems of the type involved in said co-pending application include some form of gas supply means providing a positive pressure flow of the particular gas to be inspired by the patient, with said gas supply means being connected through a flow valve to a face mask for the patient. The flow valve is arranged such that a relatively slight attempted inspiration by the patient will create a slight vacuum at the outlet port of the valve which will initiate the opening of the valve, after which, the positive pressure flow of gas through the valve will complete the valve movement to the open position and will maintain it in this open position as long as such positive pressure flow of gas is continued. In this manner, the patient is forced to inspire as much of the gas as his lungs will permit or accept, at which time the flow of gas will cease and the valve will automatically return to closed position.

An expiration gas control valve is arranged also connected to the patient's face mask for permitting exhaust to the atmosphere of expiration gases from the patient after inspiration has been completed. Such expiration gas control valve may be connected with the main inspiration gas flow valve such that said expiration gas control valve is maintained closed by inspiration gas pressure during the inspiration by the patient and said expiration gas control valve is permitted to open upon the closing of the main inspiration gas flow valve. With such arrangement, the main inspiration gas flow valve serves not only to control the flow of inspiration gases to the patient, but also serves to control the flow of expiration gases from the patient.

According to certain of the principles of the inventions disclosed in said co-pending application, sensitivity for the main inspiration gas flow valve is obtained by magnetically balancing the valve member of the flow valve such that movement of the valve member from closed position is extremely sensitive to even a slight vacuum created by the patient through attempted inspiration. Even with such flow valve extreme sensitivity, however, there are still occasions caused by the condition of the patient wherein either the patient's attempted inspiration is so weak or the patient is completely incapable of any attempted inspiration and it is necessary to provide some form of auxiliary means for at least initiating the opening of the inspiration gas flow valve for maintaining functioning of the patient's respiration system.

It is, therefore, an object of my invention to provide a flow valve for a respiration system having balance overriding means incorporated therein normally inactive and free of affecting the opening movement of the valve, but actionable upon operation thereof for momentarily altering said balancing of said valve and at least initiating movement of said valve from closed toward open position in order to provide the positive flow of inspiration gas to the patient. With such a construction, when it is observed that the patient is incapable of a sufficient attempted inspiration, or said patient is completely incapable of attempting such inspiration, said balance overriding means may be brought into operation for actuation thereof at appropriate intervals to provide the patient with the necessary positive flow of inspiration gases. In this manner, the patient's respiration system may be maintained functioning until the patient is capable of making a sufficient attempted inspiration and at proper intervals to maintain the inspiration gas flow valve automatically operable.

It is a further object of my invention to provide a flow valve for a respiration system having magnet means therein for balancing the valve member of said flow valve extremely sensitive to a minimum force tending to urge said valve member from a closed toward an open position wherein balance overriding means is incorporated in said flow valve actionable to momentarily alter said valve member balance and initiate movement of said valve member from closed toward open position despite any lack of any part of said minimum force. In one form of said balance overriding means, said means may be arranged directly actionable on the magnet means of said valve for momentarily altering positioning of said magnet means to cause a consequent alteration in the balancing of said valve and provide the initiation of the valve member movement from closed toward open position. Where the flow valve is of the poppet valve type and with a hollow valve member receiving the flow of inspiration gas therethrough and to the poppet valve portion thereof, the balance overriding means may be in the form of means for momentarily creating an inspiration gas pressure build-up within said hollow valve member when said valve member is in closed position to thereby force initiation of said valve member upon actuation of said balance overriding means to move from said closed toward open position.

It is still a further object of my invention to provide a flow valve for a respiration system having all of the foregoing attributes and advantages, and which is particularly adaptable for use in a positive pressure flow cut-off respiration system. As a result thereof, such positive pressure flow cut-off respiration system may be provided for administering oxygen and the like to a patient, with said system normally functioning automatically and according to normal attempted inspirations by said patient. If, however, the condition of the patient deteriorates to a point at which the patient's inspiration attempts are so weak as to fail to automatically actuate said system or there are no attempted inspirations by said patient, the balance overriding means of the flow valve contained in said system may be appropriately actuated for maintaining the proper inspiration cycle of said patient.

Other objects and advantages of the invention will be apparent from the following specification and the accompanying drawing which is for the purpose of illustration only, and in which:

FIG. 1 is a vertical, sectional view of a flow valve for a positive pressure flow cut-off respiration system incorporating an embodiment of the improved balance overriding means of the present invention;

FIG. 2 is an enlarged, fragmentary, vertical sectional view illustrating details of the embodiment of the balance overriding means of FIG. 1; and FIG. 3 is a side elevational view of a flow valve for a positive pressure flow cut-off respiration system including another embodiment of the balance overriding means improvements of the present invention.

Referring to FIGS. 1 and 2 of the drawing, a flow valve, generally indicated at 10, and including the improvements of the present invention, is constructed for use in a positive pressure flow cut-off respiration system, as disclosed and claimed in my said co-pending application, Ser. No. 578,184 and includes a housing 12 enclosing a unitary valve cylinder and valve seat member 14. The valve cylinder and valve seat member 14 is received in the housing 12 against an annular shoulder 16 sealed by a sealing ring 18 and dividing the housing into an upper poppet valve chamber 20 and lower shuttle valve chamber 22. The housing 12 is downwardly closed below the valve cylinder and valve seat member 14 by a bottom wall 24 secured by retaining rings 26 and sealed by a sealing ring 28, and upwardly closed at the upper end of the poppet valve chamber 20 by a top wall 30 secured against an annular shoulder 32 by a threaded retaining ring 34 and sealed by a sealing ring 36.

The valve cylinder and valve seat member 14 includes a poppet valve seat portion 38, annular plate-like in configuration and forming the lower end of the poppet valve chamber 20. A hollow cylindrical shuttle valve cylinder portion 40 extends downwardly from the poppet valve seat portion 38 and includes an internal tapered bore 42 downwardly closed by a cylinder bottom wall 44 secured against a shoulder 46 by a retaining plate 48 and sealed by a sealing ring 50. The tapered bore 42 of the shuttle valve cylinder portion 40 opens upwardly into the poppet valve chamber 20 through the poppet valve seat portion 38 communicating outwardly with an annular inlet side 52 of an outflow annular poppet valve seat 54, said valve seat having an outlet side 56 within said poppet valve chamber.

A retaining plate 58 is secured within the housing 12 intermediate the poppet valve chamber 20, said plate having an opening 60 adjacent an inspiration gas outlet port 62 communicating outwardly through the housing 12 from the poppet valve chamber 20. The opening 60, despite the intermediate positioning of the retaining plate 58, provides free gas communication from the poppet valve chamber 20 and particularly the poppet valve seat outlet side 56 into the inspiration gas outlet port 62. The retaining plate 58 mounts a series of spaced, threadably engaged retaining screws 64 extending downwardly from said retaining plate and engaged in recesses 66 of the poppet valve seat portion 38 to secure the valve cylinder and valve seat member 14 downwardly against the housing shoulder 16.

An inspiration gas inlet port 68 communicates through the housing 12 intermediate and into the shuttle valve chamber 22 and inwardly thereof within the shuttle valve chamber, the shuttle valve cylinder portion 40 of the valve cylinder and valve seat member 14 is formed with a series of inspiration gas inlet orifices 70 opening into the tapered bore 42. Spaced downwardly of the inspiration gas inlet orifices 70, the shuttle valve cylinder portion 40 is provided with an inwardly opening annular distribution groove 72 communicating outwardly of the shuttle valve cylinder portion 40 through an expiration gas control port 74, and an inwardly opening annular distribution groove 76 communicating outwardly of the shuttle valve cylinder portion through an exhaust port 78. An expiration gas control tube 80 is connected from the expiration gas control port or inflow orifice 74 outwardly through the housing 12 and an exhaust gas tube 82 connects the exhaust port 78 outwardly through the housing.

An outwardly tapered, hollow shuttle valve member 84 is vertically reciprocally received in the tapered bore 42 of the shuttle valve cylinder portion 40 on the valve cylinder and valve seat member 14, said shuttle valve member opening downwardly within said bore and being upwardly closed. A series of gas inflow or inlet and exhaust orifices 86 are formed through the hollow shuttle valve member 84 generally inwardly adjacent the inspiration gas inlet orifices 70, the expiration gas control port 74 and the exhaust port 78, the exact positioning of said gas inlet and exhaust orifices to be hereinafter more clearly pointed out. Also, a series of gas outlet orifices 88 are formed through the hollow shuttle valve member 84 near the upper end thereof and generally inwardly of the inlet side 52 of the poppet valve seat 54, the exact positioning thereof likewise to be hereinafter more fully described.

A poppet valve member 90, annular plate-like in configuration, is secured to the upper end of the shuttle valve member 84, extending outwardly thereof and overlying the poppet valve seat 54. The poppet valve member 90 is designed for movement toward and away from the poppet valve seat 54 upon reciprocal movement of the shuttle valve member 84. As shown in FIG. 1, the shuttle valve member 84 is in a closed position, retaining the poppet valve member 90 in a closed position sealing against the poppet valve seat 54. Upon movement of the shuttle valve member 84 upwardly to an open position (not shown), the poppet valve member 90 is moved upwardly to an open position, permitting gas communication over the poppet valve seat 54 between the inlet side 52 and the outlet side 56 thereof.

The gas inlet and exhaust orifices 86 of the shuttle valve member 84 are positioned so as to be spaced downwardly from the inspiration gas inlet orifices 70 of the shuttle valve cylinder portion 40 when the shuttle valve member is in the downward closed position, as shown in FIG. 1, said gas inlet and exhaust orifices in such position communicating with both the expiration gas control port 74 and the exhaust port 78, while the shuttle valve member substantially seals off the inspiration gas inlet orifices 70. At the same time, when the shuttle valve member 84 is moved upwardly to its open position, the gas inlet and exhaust orifices 86 thereof will communicate with both the inspiration gas inlet orifices 70 of the shuttle valve cylinder portion 40 and the expiration gas control port 74 thereof, while the shuttle valve member below said gas inlet and exhaust orifices will substantially seal off the exhaust port 78 of the shuttle valve cylinder portion. As hereinbefore set forth, when the shuttle valve member 84 is in the downward closed position, as shown in FIG. 1, the poppet valve member 90 is in downward closed position sealing against the poppet valve seat 54 and upward movement of the shuttle and poppet valve members to open position spaces the poppet valve member above the poppet valve seat, with the gas outlet orifices 88 of the shuttle valve member being positioned to communicate freely with the poppet valve seat inlet side 52 at least when the shuttle and poppet valve members are in such upwardly open positions.

A valve member magnet 92 is secured to the shuttle valve member 84 overlying the poppet valve member 90 for movement exactly with said shuttle and poppet valve members. A repelling magnet 94, that is, repelling the valve member magnet 92, is threadably adjustably secured to the shuttle valve cylinder portion 40 of the valve cylinder and valve seat member 14 through a retaining ring 96. Also, an attracting magnet 98 attracting the valve member magnet 92 is mounted at the lower end of a positioning screw 100 within the poppet valve chamber 20, said positioning screw being threadably adjustably engaged through the housing top wall 30 projecting thereabove with a positioning knob 102 secured to the upper end thereof.

Thus, the repelling magnet 94 underlying the valve member magnet 92 will magnetically urge the valve member magnet, as well as the shuttle and poppet valve members 84 and 90, upwardly from the closed toward the open positions. The attracting magnet 98 overlying the valve member magnet 92 will similarly magnetically urge the shuttle and poppet valve members 84 and 90. Furthermore, selective adjustment of the repelling magnet 94 around the shuttle valve cylinder portion 40 and the attracting magnet 98 through the positioning screw 100 and positioning knob 102 will balance the shuttle and poppet valve members 84 and 90 in the downward closed positions, as shown in FIG. 1, and extremely sensitive to a minimum force tending to move such valve members toward the upper open positions thereof.

The balancing of the shuttle and poppet valve members 84 and 90 by the various magnets described is regulated taking into account the combined weights of the shuttle and poppet valve members 84 and 90 and the valve member magnet 92. The important point is that the shuttle and poppet valve members 84 and 90 will be balanced in the lower closed positions thereof, as shown in FIG. 1, extremely sensitive to a minimum force tending to move such valve members upwardly toward the open positions thereof. As will be hereinafter more fully described, such minimum force in the valve 10 illustrated herein and for use in a positive pressure flow cut-off respiration system is a slight vacuum force at the inspiration gas outlet port 62 created by a patient's attempted inspiration in the patient's breathing attempts. The negative pressure created within the poppet valve chamber 20 by the patient's attempted inspiration may be measured through a pressure gauge tube 104 opening into the poppet valve chamber and extending downwardly and outwardly of the housing 12 for connection to an appropriate gauge (not shown), with said tube and gauge also measuring the positive pressure of inspiration gas flow through the poppet valve chamber.

Thus, with the valve 10, as thus far described, and as clearly set forth in my said co-pending application, Ser. No. 578,184, the inspiration gas inlet port 68 may be connected to a positive pressure flow source of inspiration gas, such as oxygen, and the inspiration gas outlet port 62 may be connected to a patient's face mask. Also, the expiration gas control tube 80 is connected to an expiration valve at the patient's face mask for venting the patient's expiration gases to the atmosphere at appropriate intervals. As hereinbefore set forth, the repelling and attracting magnets 94 and 98 will be properly adjusted relative to the valve member magnet 92 so as to provide the shuttle and poppet valve members 84 and 90 extremely sensitive in the downward closed positions thereof to a minimum force tending to move such valve members upwardly toward the open positions thereof.

During the expiration by the patient, the shuttle and poppet valve members 84 and 90 will be in the downward closed positions thereof, as shown in FIG. 1, with the shuttle valve member substantially sealing off the inspiration gas inlet orifices 70 and the poppet valve member sealed against the poppet valve seat 54 preventing the positive pressure flow of inspiration gas through the valve 10. At the same time, the hollow shuttle valve member 84 and the gas inlet and exhaust orifices 86 thereof provide communication from the expiration gas control port 74 to the exhaust port 78 so that the patient's expiration gases are being vented to the atmosphere. Such positioning continues until the patient is ready to inspire.

An attempted inspiration by the patient will cause a slight vacuum force at the inspiration gas outlet port 62 which slight force combined with the sensitive balancing of the various magnets 92, 94 and 98 will initiate movement of the shuttle and poppet valve members 84 and 90 upwardly toward the upper open positions thereof. As soon as such upward movement is initiated, a positive pressure flow of inspiration gases will commence through the inspiration gas inlet port 68, through the inspiration gas inlet orifices 70, through the gas inlet and exhaust orifices 86 into the hollow shuttle valve member 84 and from the shuttle valve member through the gas outlet orifices 88, over the poppet valve seat 54, through the poppet valve chamber 20 and through the inspiration gas outlet port 62 to the patient's face mask. The force of this positive pressure flow of inspiration gases through the valve 10 will immediately force the shuttle and poppet valve members 84 and 90 upwardly to the open positions thereof so that such positive pressure flow of inspiration gases will continue until the patient's lungs have been substantially filled. During such time and due to the upward movement of the shuttle valve member 84, the shuttle valve member will have substantially sealed off the exhaust port 78 in view of the upper displacement of the gas inlet and exhaust orifices 86, while a certain portion of the inspiration gases will exert pressure into the expiration gas control port 74, thereby exerting pressure through the expiration gas control tube 80 to the expiration valve at the patient's face mask, maintaining such expiration valve closed during inspiration by the patient.

As soon as the patient's lungs are filled with the inspiration gases, the flow thereof through the valve 10 will stop and the shuttle and poppet valve members 84 and 90 will immediately move downwardly to their lower closed positions, as shown in FIG. 1, returning the system to the expiration condition ready for expiration by the patient, as previously described. The various magnets 92, 94 and 98 will, of course, permit such downward movement of the shuttle and poppet valve members 84 and 90, and the upward and downward movements of the shuttle and poppet valve members will continue under normal inspiration and expiration by the patient as long as the patient's condition is of a nature to provide the inspiration impulses at the inspiration gas outlet port 62 by the patient's attempted inspirations. There are occasions, however, when the patient's condition may deteriorate to the point where either the patient's inspiration attempts are so feeble as to not create a sufficient vacuum at the inspiration gas outlet port 62 to actuate the shuttle and poppet valve members 84 and 90, as described, or the patient is completely incapable of attempting any inspiration, in which case, the valve 10, as thus far described, would not function and the patient would not be provided inspiration gases.

In view of the possibility of such a situation developing, and more particularly, according to the improvements of the present invention, balance overriding means is provided in the valve 10 which could be selectively automatically actuated upon a detection automatically or otherwise of such situation developing, but in the particular embodiment shown in FIGS. 1 and 2 is selectively manually actuated. From the broad standpoint, the purpose of such balance overriding means is to initially actuate or initiate upward movement of the shuttle and poppet valve members 84 and 90 toward their upper open positions independent of any attempted inspirations by the patient so that when the patient's condition deteriorates to a point where the patient cannot automatically actuate the valve, such balance overriding means may be immediately brought into play for properly providing the patient with the inspiration gases. As used herein and in the appended claims, the term "selectively" is intended to be broadly construed as meaning by automatic selection controlled by an automatic detection and operating device, or selection from physical senses of a person manually actuating said balance overriding means or manually starting automatic operation of said balance overriding means.

According to such improvements as illustrated in the embodiment of FIGS. 1 and 2, the attracting magnet 98 is mounted on the positioning screw 100 through a plunger 106, said plunger being telescoped upwardly through the positioning screw and having a button 108 reciprocal within a recess 110 in the positioning knob 102. A coil spring 112 is positioned within the positioning knob recess 110 for normally resiliently urging the attracting magnet 98 tightly against the lower end of the positioning screw 100, as shown in FIG. 2. Thus, the attracting magnet 98 will normally be threadably adjustably movable upwardly and downwardly by the positioning screw 100 in the normal manner for exactly obtaining the desired balance of the shuttle and poppet valve members 84 and 90, as previously described, and dependent on the patient's attempted inspirations for the actuation of the valve 10.

When, however, the patient is incapable of providing such attempted inspirations, the button 108 may be manually depressed at appropriate intervals to move the attracting magnet 98 downwardly and sufficiently overcome the normal balancing of the shuttle and poppet valve members 84 and 90 to initiate movement of such shuttle and poppet valve members upwardly toward the open positions thereof. The movement of the attracting magnet 98 closer to the valve member magnet 92 will increase the magnetic attraction therebetween and provide a sufficient magnetic force to initiate such valve member movement, thereby overriding the normal balancing thereof.

Important to the principles of a second embodiment of the balance overriding means of the present invention, but still referring for the moment to FIG. 1, is the fact that under normal manufacturing procedures in the formation of the described tapered fit between the shuttle valve member 84 and the shuttle valve cylinder portion 40 of the valve cylinder and valve seat member 14, there will always be some positive pressure inspiration gas leakage from the inspiration gas inlet port 68 through the inspiration gas inlet orifices 70 around the shuttle valve member into the interior thereof, despite the fact that such shuttle valve member is in the lower closed position, as shown in FIG. 1. Since the interior of the shuttle valve member 84 in such closed position is in communication with the exhaust port 78 through the gas inlet and exhaust orifices 86, such positive pressure gas leakage into the shuttle valve member will merely exhaust outwardly through the exhaust port and the exhaust gas tube 82 so that there will normally not be a pressure buildup within the shuttle valve member. Thus, despite such pressure inspiration gas leakage, the valve 10 will still properly function in the manner described.

According to the second embodiment of the present invention, however, such positive pressure inspiration gas leakage can be taken advantage of to provide the balance overriding means for the valve 10 without the necessity of mounting the attracting magnet 98 manually movable, as described. As shown in FIG. 3, an extension tube 114 is connected in communication with the previously described exhaust gas tube 82 (FIG. 1) and such extension tube is formed with a selectively manually closable valve 116. To initiate movement of the previously described shuttle and poppet valve members 84 and 90 (FIG. 1) upwardly toward the open positions thereof, it is merely necessary to close the valve 116, sealing off the previously described positive pressure inspiration gas leakage into the valve causing a pressure buildup for initiating such valve member movement.

I have provided according to the present invention, therefore, a flow valve usable in a positive pressure flow cut-off respiration system which is normally magnetically balanced extremely sensitive to a minimum force in the form of a slight vacuum created by an attempted inspiration by a patient for initiating movement of the valve members thereof from closed toward open positions, while at the same time, I have provided balance overriding means which may be brought into operation for overriding said balance and causing initial movement of such valve members where the patient is incapable of providing a sufficient inspiration vacuum for actuating said valve.

I claim:
1. In a flow sensitive valve for use in conjunction with a respiration system, the combination of: a housing having gas inlet and outlet ports; a valve member in said housing between said inlet and outlet ports; means operably connecting said valve member to said housing for movement between a closed position interrupting the positive flow of upstream gas through said housing between said inlet and outlet ports and an open position permitting the positive flow of upstream gas through said housing between said ports and to downstream of said ports, said valve member and said means connecting said valve member being constructed and arranged preventing any pressure of gas upstream of said inlet port from moving said valve member from said closed position when said valve member is fully in said closed position, said means connecting said valve member including magnet means actionable between said valve member and housing for balancing said valve member in said closed position sensitive to a minimum negative force downstream of said outlet port caused by a flow of gas away from said outlet port tending to draw and thereby move said valve mem- ber initially from said closed to said open position and permitting continued opening movement by said positive flow of upstream gas to said open position, said valve member automatically returning from said open position to fully into said closed position upon cessation of flow of said upstream gas through said housing; and balance overriding means normally inactive and free of affecting said valve member movement when free of actuation, said balance overriding means being actionable only upon selective momentary operation thereof for momentarily altering said balance of said valve member in said fully closed position to initially begin to move said valve member from said fully closed to said open position despite any lack of any part of said minimum negative downstream flow force, said balance overriding means including operating means for selectively momentarily actuating said balance overriding means, said operating means automatically returning said balance overriding means to an exact original normally inactive condition at termination of said operation.

2. A flow sensitive valve as defined in claim 1 in which said balance overriding means includes means operably connected to said operating means for directly altering said magnet means effect on and balancing of said valve member in said closed position upon said momentary actuation of said balance overriding means by said operating means with said valve member in said closed position to replace at least a part of said minimum negative downstream flow force and magnetically urge said valve member initially from said closed toward said open position.

3. A flow sensitive valve as defined in claim 1 in which said balance overriding means includes means operably connected to said operating means for directly altering said magnet means effect on and balancing of said valve member in said closed position upon said momentary actuation of said balance overriding means with said valve member in said closed position to replace at least a part of said minimum negative downstream flow force and magnetically urge said valve member initially from said closed toward said open position; and in which said operating means includes selectively manually operable means for actuating said balance overriding means upon said manual operation thereof and automatically returning said balance overriding means to said exact original normally inactive condition upon termination of said manual operation.

4. A flow sensitive valve as defined in claim 1 in which said magnet means includes a magnet mounted normally stationary on said housing, a magnet on and movable with said valve member, the spaced relationship between said housing and valve member magnets determining said balancing and sensitivity to said minimum negative downstream flow force of said valve member when said valve member is in said closed position; and in which said balance overriding means includes means operably connected to said operating means for momentarily altering said housing and valve member magnet spacing when said valve member is in said closed position to initially begin to move said valve member toward said open position.

5. A flow sensitive valve as defined in claim 1 in which said valve member is a hollow poppet valve member sealing between inflow orifices when in said closed position and connecting said orifices and the flow of gas through said orifices in said open position, said hollow valve member closing against an outflow poppet valve seat when in said closed position to substantially close said hollow valve member between said inflow orifices and said outflow poppet valve seat, said hollow valve member including means directing said flow of gas from said inlet port through said orifices and said hollow valve member and over said poppet valve seat to said outlet port; and in which said balance overriding means includes means operably connected to said operating means for creating a gas pressure buildup within said hollow valve member between said inflow orifices and said outflow poppet valve seat from said gas inlet port tending to urge said valve member initially toward said open position when said valve member is in said fully closed position and said balance overriding means is actuated to initially begin to move said valve member toward said open position.

6. In a flow sensitive valve for use in conjunction with a positive pressure flow cutoff respiration system, the combination of: a housing having gas inlet and outlet ports; a valve member in said housing between said inlet and outlet ports; means operably connecting said valve member to said housing for automatically moving to an open position from a fully closed position permitting a positive pressure flow of upstream gas through said housing between said inlet and outlet ports upon the combination of an initial negative force downstream of said outlet port created through attempted inspiration by a patient causing a flow of gas away from and downstream of said outlet port initiating said opening movement immediately followed by said positive pressure upstream gas flow through said housing forcing completion of said valve member opening movement, said valve member and said means connecting said valve member being constructed and arranged preventing any pressure of any gas upstream of said inlet port from moving said valve member from said fully closed position when said valve member is in said fully closed position, said valve member automatically moving to said fully closed position sealing off any possible further flow of positive pressure upstream gas through said housing between said ports upon cessation of said gas flow upon the lung capacity of said patient once having been reached and stopping said flow, said means including magnet means actionable between said valve member and housing for balancing said valve member sensitive to said initial negative downstream force and said following positive pressure upstream gas flow and permitting movement of said valve member from said fully closed to and from said open position; and balance overriding means normally inactive and free of affecting said valve member movement when free of actuation, said balance overriding means being actionable only upon selective momentary operation thereof for momentarily altering said balance of said valve member in said fully closed position to initiate said movement of said valve member from said fully closed to said open position despite any lack of any part of said initial negative downstream force created by said patient, said balance overriding means including operating means for selectively momentarily actuating said balance overriding means, said operating means automatically returning said balance overriding means to an exact original normally inactive condition at termination of said operation.

7. A flow sensitive valve as defined in claim 6 in which said balance overriding means includes means operably connected to said operating means, for selectively momentarily altering the relationship between said magnet means and said valve member when said valve member is in said fully closed position to alter said balancing of said valve member and initially urge said valve member from said fully closed toward said open position.

8. A flow sensitive valve as defined in claim 6 in which said magnet means includes magnet means on said housing tending to urge said valve member from said closed toward said open position, said housing magnet means normally being spaced from said valve member a predetermined distance when said valve member is in said fully closed position for creating said balancing of said valve member; and in which said balance overriding means includes means operably connected to said operating means and operably connected to said housing magnet means for momentarily reducing said predetermined spacing of said housing magnet means from said valve member when said valve member is in said fully closed position to alter said valve member balancing and initiate said movement of said valve member from said fully closed toward said open position.

9. A flow sensitive valve as defined in claim 6 in which said magnet means includes magnet means on said housing exerting a magnetic force on said valve member tending to urge said valve member from said closed toward said open position, said housing magnet means being spaced from said valve member a normal predetermined distance when said valve member is in said fully closed position with said magnetic force creating said balancing of said valve member; and in which said operating means of said balance overriding means includes means normally resiliently retaining said housing magnet means spaced said predetermined distance from said valve member when said valve member is in said fully closed position and actionable to momentarily move said housing magnet means toward said valve member in said fully closed position for momentarily reducing said predetermined distance.

10. A flow sensitive valve as defined in claim 6 in which said valve member is a hollow poppet valve member sealing between inflow orifices when said valve member is in said closed position and connecting said orifices and permitting the flow of gas through said orifices when said valve member is in said open position, said hollow valve member closing against an outflow poppet valve seat when in said closed position to substantially close said hollow valve member between said inflow orifices and said outflow poppet valve seat, said hollow valve member including means for directing said flow of gas from said gas inlet port through said orifices and said valve member and over said poppet valve seat to said outlet port; and in which said balance overriding means includes means operably connected to said operating means actionable when said valve member is in said fully closed position for creating a gas pressure buildup within said valve member between said inflow orifices and said outflow poppet valve seat tending to urge said valve member from said fully closed initially toward open position, said gas pressure buildup within said valve member creating said valve member initial movement from said fully closed position toward said open position.

References Cited

UNITED STATES PATENTS

| | | | |
|---|---|---|---|
| 2,287,840 | 6/1942 | Stratton | 137—538 XR |
| 2,575,906 | 11/1951 | Bullard | 251—65 XR |
| 2,700,395 | 1/1955 | Young | 251—65 XR |
| 3,039,481 | 6/1962 | Schreiber et al. | 251—65 XR |
| 3,212,751 | 10/1965 | Hassa | 251—65 |

WILLIAM F. O'DEA, Primary Examiner

R. GERARD, Assistant Examiner

U.S. Cl. X.R.

137—102, 513; 251—65